(12) United States Patent
Patterson

(10) Patent No.: US 10,977,657 B2
(45) Date of Patent: Apr. 13, 2021

(54) TOKEN PROCESSING UTILIZING MULTIPLE AUTHORIZATIONS

(71) Applicant: Visa International Service Association, San Francisco, CA (US)

(72) Inventor: Barbara Patterson, South San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 864 days.

(21) Appl. No.: 15/019,157

(22) Filed: Feb. 9, 2016

(65) Prior Publication Data
US 2016/0232527 A1    Aug. 11, 2016

Related U.S. Application Data

(60) Provisional application No. 62/113,671, filed on Feb. 9, 2015.

(51) Int. Cl.
*G06Q 20/38* (2012.01)
*G06Q 20/40* (2012.01)

(52) U.S. Cl.
CPC ......... *G06Q 20/405* (2013.01); *G06Q 20/401* (2013.01)

(58) Field of Classification Search
CPC ................................................ G06Q 20/401
USPC ........................................................ 705/64
See application file for complete search history.

(56) References Cited

U.S. PATENT DOCUMENTS

| | | | |
|---|---|---|---|
| 5,613,012 A | 3/1997 | Hoffman | |
| 5,781,438 A | 7/1998 | Lee | |
| 5,883,810 A | 3/1999 | Franklin | |
| 5,953,710 A | 9/1999 | Fleming | |
| 5,956,699 A | 9/1999 | Wong | |
| 6,000,832 A | 12/1999 | Franklin | |
| 6,014,635 A | 1/2000 | Harris | |
| 6,029,141 A * | 2/2000 | Bezos | G06Q 20/0855 705/26.41 |
| 6,044,360 A | 3/2000 | Picciallo | |
| 6,163,771 A | 12/2000 | Walker | |
| 6,227,447 B1 | 5/2001 | Campisano | |
| 6,236,981 B1 | 5/2001 | Hill | |
| 6,267,292 B1 | 7/2001 | Walker | |
| 6,327,578 B1 | 12/2001 | Linehan | |

(Continued)

FOREIGN PATENT DOCUMENTS

| | | |
|---|---|---|
| EP | 2156397 A1 | 2/2010 |
| WO | 2001035304 A1 | 5/2001 |

(Continued)

OTHER PUBLICATIONS

Ron White, How Computers Work, Oct. 15, 2003, Que Publishing, 7th Ed. (Year: 2003).*

(Continued)

*Primary Examiner* — Chinedu C Agwumezie
(74) *Attorney, Agent, or Firm* — Kilpatrick Townsend & Stockton LLP

(57) ABSTRACT

Embodiments of the invention provide for faster and more efficient data processing, and can utilize multiple authorizations and tokens having domain restrictions. The different authorizations may be related, and a related transaction indicator as well as reference data may be included in authorization requests made after an initial authorization.

10 Claims, 4 Drawing Sheets

(56) References Cited

U.S. PATENT DOCUMENTS

| | | |
|---|---|---|
| 6,341,724 B2 | 1/2002 | Campisano |
| 6,385,596 B1 | 5/2002 | Wiser |
| 6,422,462 B1 | 7/2002 | Cohen |
| 6,425,523 B1 | 7/2002 | Shem Ur |
| 6,592,044 B1 | 7/2003 | Wong |
| 6,636,833 B1 | 10/2003 | Flitcroft |
| 6,748,367 B1 | 6/2004 | Lee |
| 6,805,287 B2 | 10/2004 | Bishop |
| 6,879,965 B2 | 4/2005 | Fung |
| 6,891,953 B1 | 5/2005 | DeMello |
| 6,901,387 B2 | 5/2005 | Wells |
| 6,931,382 B2 | 8/2005 | Laage |
| 6,938,019 B1 | 8/2005 | Uzo |
| 6,941,285 B2 | 9/2005 | Sarcanin |
| 6,980,670 B1 | 12/2005 | Hoffman |
| 6,990,470 B2 | 1/2006 | Hogan |
| 6,991,157 B2 | 1/2006 | Bishop |
| 7,051,929 B2 | 5/2006 | Li |
| 7,069,249 B2 | 6/2006 | Stolfo |
| 7,103,576 B2 | 9/2006 | Mann, III |
| 7,113,930 B2 | 9/2006 | Eccles |
| 7,136,835 B1 | 11/2006 | Flitcroft |
| 7,177,835 B1 | 2/2007 | Walker |
| 7,177,848 B2 | 2/2007 | Hogan |
| 7,194,437 B1 | 3/2007 | Britto |
| 7,264,154 B2 | 9/2007 | Harris |
| 7,287,692 B1 | 10/2007 | Patel |
| 7,292,999 B2 | 11/2007 | Hobson |
| 7,350,230 B2 | 3/2008 | Forrest |
| 7,353,382 B2 | 4/2008 | Labrou |
| 7,379,919 B2 | 5/2008 | Hogan |
| RE40,444 E | 7/2008 | Linehan |
| 7,415,443 B2 | 8/2008 | Hobson |
| 7,444,676 B1 | 10/2008 | Asghari-Kamrani |
| 7,469,151 B2 | 12/2008 | Khan |
| 7,548,889 B2 | 6/2009 | Bhambri |
| 7,567,934 B2 | 7/2009 | Flitcroft |
| 7,567,936 B1 | 7/2009 | Peckover |
| 7,571,139 B1 | 8/2009 | Giordano |
| 7,571,142 B1 | 8/2009 | Flitcroft |
| 7,580,898 B2 | 8/2009 | Brown |
| 7,584,153 B2 | 9/2009 | Brown |
| 7,593,896 B1 | 9/2009 | Flitcroft |
| 7,606,560 B2 | 10/2009 | Labrou |
| 7,627,531 B2 | 12/2009 | Breck |
| 7,627,895 B2 | 12/2009 | Gifford |
| 7,650,314 B1 | 1/2010 | Saunders |
| 7,685,037 B2 | 3/2010 | Reiners |
| 7,702,578 B2 | 4/2010 | Fung |
| 7,707,120 B2 | 4/2010 | Dominguez |
| 7,712,655 B2 | 5/2010 | Wong |
| 7,734,527 B2 | 6/2010 | Uzo |
| 7,753,265 B2 | 7/2010 | Harris |
| 7,770,789 B2 | 8/2010 | Oder, II |
| 7,784,685 B1 | 8/2010 | Hopkins, III |
| 7,793,851 B2 | 9/2010 | Mullen |
| 7,801,826 B2 | 9/2010 | Labrou |
| 7,805,376 B2 | 9/2010 | Smith |
| 7,805,378 B2 | 9/2010 | Berardi |
| 7,828,220 B2 | 11/2010 | Mullen |
| 7,835,960 B2 | 11/2010 | Breck |
| 7,841,523 B2 | 11/2010 | Oder, II |
| 7,841,539 B2 | 11/2010 | Hewton |
| 7,844,550 B2 | 11/2010 | Walker |
| 7,849,020 B2 | 12/2010 | Johnson |
| 7,853,529 B1 | 12/2010 | Walker |
| 7,853,995 B2 | 12/2010 | Chow |
| 7,865,414 B2 | 1/2011 | Fung |
| 7,873,579 B2 | 1/2011 | Hobson |
| 7,873,580 B2 | 1/2011 | Hobson |
| 7,890,393 B2 | 2/2011 | Talbert |
| 7,891,563 B2 | 2/2011 | Oder, II |
| 7,896,238 B2 | 3/2011 | Fein |
| 7,922,082 B2 | 4/2011 | Muscato |
| 7,931,195 B2 | 4/2011 | Mullen |
| 7,938,318 B2 | 5/2011 | Fein |
| 7,954,705 B2 | 6/2011 | Mullen |
| 7,959,076 B1 | 6/2011 | Hopkins, III |
| 7,996,288 B1 | 8/2011 | Stolfo |
| 8,025,223 B2 | 9/2011 | Saunders |
| 8,046,256 B2 | 10/2011 | Chien |
| 8,060,448 B2 | 11/2011 | Jones |
| 8,060,449 B1 | 11/2011 | Zhu |
| 8,074,877 B2 | 12/2011 | Mullen |
| 8,074,879 B2 | 12/2011 | Harris |
| 8,082,210 B2 | 12/2011 | Hansen |
| 8,095,113 B2 | 1/2012 | Kean |
| 8,104,679 B2 | 1/2012 | Brown |
| RE43,157 E | 2/2012 | Bishop |
| 8,109,436 B1 | 2/2012 | Hopkins, III |
| 8,121,942 B2 | 2/2012 | Carlson |
| 8,121,956 B2 | 2/2012 | Carlson |
| 8,126,449 B2 | 2/2012 | Beenau |
| 8,171,525 B1 | 5/2012 | Pelly |
| 8,196,813 B2 | 6/2012 | Vadhri |
| 8,205,791 B2 | 6/2012 | Randazza |
| 8,224,702 B2 | 7/2012 | Mengerink |
| 8,225,385 B2 | 7/2012 | Chow |
| 8,265,993 B2 | 9/2012 | Chien |
| 8,280,777 B2 | 10/2012 | Mengerink |
| 8,328,095 B2 | 12/2012 | Oder, II |
| 8,376,225 B1 | 2/2013 | Hopkins, III |
| 8,380,177 B2 | 2/2013 | Laracey |
| 8,387,873 B2 | 3/2013 | Saunders |
| 8,401,539 B2 | 3/2013 | Beenau |
| 8,401,898 B2 | 3/2013 | Chien |
| 8,402,555 B2 | 3/2013 | Grecia |
| 8,403,211 B2 | 3/2013 | Brooks |
| 8,412,623 B2 | 4/2013 | Moon |
| 8,412,837 B1 | 4/2013 | Emigh |
| 8,417,642 B2 | 4/2013 | Oren |
| 8,447,699 B2 | 5/2013 | Batada |
| 8,453,223 B2 | 5/2013 | Svigals |
| 8,453,925 B2 | 6/2013 | Fisher |
| 8,458,487 B1 | 6/2013 | Palgon |
| 8,484,134 B2 | 7/2013 | Hobson |
| 8,485,437 B2 | 7/2013 | Mullen |
| 8,494,959 B2 | 7/2013 | Hathaway |
| 8,498,908 B2 | 7/2013 | Mengerink |
| 8,504,478 B2 | 8/2013 | Saunders |
| 8,510,816 B2 | 8/2013 | Quach |
| 8,533,860 B1 | 9/2013 | Grecia |
| 8,538,845 B2 | 9/2013 | Liberty |
| 8,555,079 B2 | 10/2013 | Shablygin |
| 8,566,168 B1 | 10/2013 | Bierbaum |
| 8,567,670 B2 | 10/2013 | Stanfield |
| 8,571,939 B2 | 10/2013 | Lindsey |
| 8,577,336 B2 | 11/2013 | Mechaley, Jr. |
| 8,577,803 B2 | 11/2013 | Chatterjee |
| 8,578,176 B2 | 11/2013 | Mattsson |
| 8,583,494 B2 | 11/2013 | Fisher |
| 8,584,251 B2 | 11/2013 | Mcguire |
| 8,589,237 B2 | 11/2013 | Fisher |
| 8,589,271 B2 | 11/2013 | Evans |
| 8,589,291 B2 | 11/2013 | Carlson |
| 8,595,098 B2 | 11/2013 | Starai |
| 8,595,812 B2 | 11/2013 | Bomar |
| 8,595,850 B2 | 11/2013 | Spies |
| 8,606,638 B2 | 12/2013 | Dragt |
| 8,606,700 B2 | 12/2013 | Carlson |
| 8,606,720 B1 | 12/2013 | Baker |
| 8,615,468 B2 | 12/2013 | Varadarajan |
| 8,620,754 B2 | 12/2013 | Fisher |
| 8,635,157 B2 | 1/2014 | Smith |
| 8,646,059 B1 | 2/2014 | Von Behren |
| 8,651,374 B2 | 2/2014 | Brabson |
| 8,656,180 B2 | 2/2014 | Shablygin |
| 8,751,391 B2 | 6/2014 | Freund |
| 8,887,308 B2 | 11/2014 | Grecia |
| 2001/0029485 A1 | 10/2001 | Brody |
| 2001/0034720 A1 | 10/2001 | Armes |
| 2001/0054003 A1 | 12/2001 | Chien |
| 2002/0007320 A1 | 1/2002 | Hogan |
| 2002/0016749 A1 | 2/2002 | Borecki |

(56) References Cited

U.S. PATENT DOCUMENTS

| | | |
|---|---|---|
| 2002/0029193 A1 | 3/2002 | Ranjan |
| 2002/0035548 A1 | 3/2002 | Hogan |
| 2002/0073045 A1 | 6/2002 | Rubin |
| 2002/0116341 A1 | 8/2002 | Hogan |
| 2002/0132662 A1 | 9/2002 | Sharp et al. |
| 2002/0133467 A1 | 9/2002 | Hobson |
| 2002/0147913 A1 | 10/2002 | Lun Yip |
| 2003/0018567 A1* | 1/2003 | Flitcroft ............ G06Q 20/24 705/37 |
| 2003/0028481 A1 | 2/2003 | Flitcroft |
| 2003/0130955 A1 | 7/2003 | Hawthorne |
| 2003/0191709 A1 | 10/2003 | Elston |
| 2003/0191945 A1 | 10/2003 | Keech |
| 2004/0010462 A1 | 1/2004 | Moon |
| 2004/0050928 A1 | 3/2004 | Bishop |
| 2004/0059682 A1 | 3/2004 | Hasumi |
| 2004/0093281 A1 | 5/2004 | Silverstein |
| 2004/0139008 A1 | 7/2004 | Mascavage |
| 2004/0143532 A1 | 7/2004 | Lee |
| 2004/0158532 A1 | 8/2004 | Breck |
| 2004/0210449 A1 | 10/2004 | Breck |
| 2004/0210498 A1 | 10/2004 | Freund |
| 2004/0232225 A1 | 11/2004 | Bishop |
| 2004/0260646 A1 | 12/2004 | Berardi |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer |
| 2005/0269402 A1 | 12/2005 | Spitzer |
| 2006/0235795 A1 | 10/2006 | Johnson |
| 2006/0237528 A1 | 10/2006 | Bishop |
| 2006/0278704 A1 | 12/2006 | Saunders |
| 2007/0107044 A1 | 5/2007 | Yuen |
| 2007/0129955 A1 | 6/2007 | Dalmia |
| 2007/0136193 A1 | 6/2007 | Starr |
| 2007/0136211 A1 | 6/2007 | Brown |
| 2007/0170247 A1 | 7/2007 | Friedman |
| 2007/0179885 A1 | 8/2007 | Bird |
| 2007/0208671 A1 | 9/2007 | Brown |
| 2007/0245414 A1 | 10/2007 | Chan |
| 2007/0288377 A1 | 12/2007 | Shaked |
| 2007/0291995 A1 | 12/2007 | Rivera |
| 2008/0015988 A1 | 1/2008 | Brown |
| 2008/0029607 A1 | 2/2008 | Mullen |
| 2008/0035738 A1 | 2/2008 | Mullen |
| 2008/0052226 A1 | 2/2008 | Agarwal |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan |
| 2008/0065555 A1 | 3/2008 | Mullen |
| 2008/0201264 A1 | 8/2008 | Brown |
| 2008/0201265 A1 | 8/2008 | Hewton |
| 2008/0228646 A1 | 9/2008 | Myers |
| 2008/0243702 A1 | 10/2008 | Hart |
| 2008/0245855 A1 | 10/2008 | Fein |
| 2008/0245861 A1 | 10/2008 | Fein |
| 2008/0283591 A1 | 11/2008 | Oder, II |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown |
| 2009/0010488 A1 | 1/2009 | Matsuoka |
| 2009/0037333 A1 | 2/2009 | Flitcroft |
| 2009/0037388 A1 | 2/2009 | Cooper |
| 2009/0043702 A1 | 2/2009 | Bennett |
| 2009/0048971 A1 | 2/2009 | Hathaway |
| 2009/0106112 A1 | 4/2009 | Dalmia |
| 2009/0106160 A1 | 4/2009 | Skowronek |
| 2009/0134217 A1 | 5/2009 | Flitcroft |
| 2009/0157555 A1 | 6/2009 | Biffle |
| 2009/0159673 A1 | 6/2009 | Mullen |
| 2009/0159700 A1 | 6/2009 | Mullen |
| 2009/0159707 A1 | 6/2009 | Mullen |
| 2009/0173782 A1 | 7/2009 | Muscato |
| 2009/0200371 A1 | 8/2009 | Kean |
| 2009/0248583 A1 | 10/2009 | Chhabra |
| 2009/0276347 A1 | 11/2009 | Kargman |
| 2009/0294527 A1 | 12/2009 | Brabson |
| 2009/0307139 A1 | 12/2009 | Mardikar |
| 2009/0308921 A1 | 12/2009 | Mullen |
| 2009/0327131 A1 | 12/2009 | Beenau |
| 2010/0008535 A1 | 1/2010 | Abulafia |
| 2010/0088237 A1 | 4/2010 | Wankmueller |
| 2010/0094755 A1 | 4/2010 | Kloster |
| 2010/0106644 A1 | 4/2010 | Annan |
| 2010/0120408 A1 | 5/2010 | Beenau |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru |
| 2010/0211505 A1 | 8/2010 | Saunders |
| 2010/0223186 A1* | 9/2010 | Hogan ............ G06Q 20/02 705/71 |
| 2010/0228668 A1 | 9/2010 | Hogan |
| 2010/0235284 A1* | 9/2010 | Moore ............ G06F 21/335 705/75 |
| 2010/0258620 A1 | 10/2010 | Torreyson |
| 2010/0291904 A1 | 11/2010 | Musfeldt |
| 2010/0306076 A1 | 12/2010 | Taveau |
| 2010/0325041 A1 | 12/2010 | Berardi |
| 2011/0010292 A1 | 1/2011 | Giordano |
| 2011/0016047 A1 | 1/2011 | Wu |
| 2011/0016320 A1 | 1/2011 | Bergsten |
| 2011/0040640 A1 | 2/2011 | Erikson |
| 2011/0083018 A1 | 4/2011 | Kesanupalli |
| 2011/0087596 A1 | 4/2011 | Dorsey |
| 2011/0093397 A1 | 4/2011 | Carlson |
| 2011/0125597 A1 | 5/2011 | Oder, II |
| 2011/0153437 A1 | 6/2011 | Archer |
| 2011/0154466 A1 | 6/2011 | Harper |
| 2011/0161233 A1 | 6/2011 | Tieken |
| 2011/0191244 A1 | 8/2011 | Dai |
| 2011/0238511 A1 | 9/2011 | Park |
| 2011/0238573 A1 | 9/2011 | Varadarajan |
| 2011/0246317 A1 | 10/2011 | Coppinger |
| 2011/0272471 A1 | 11/2011 | Mullen |
| 2011/0272478 A1 | 11/2011 | Mullen |
| 2011/0276380 A1 | 11/2011 | Mullen |
| 2011/0276381 A1 | 11/2011 | Mullen |
| 2011/0276424 A1 | 11/2011 | Mullen |
| 2011/0276425 A1 | 11/2011 | Mullen |
| 2011/0295745 A1 | 12/2011 | White |
| 2011/0302081 A1 | 12/2011 | Saunders |
| 2012/0028609 A1 | 2/2012 | Hruska |
| 2012/0035998 A1 | 2/2012 | Chien |
| 2012/0041881 A1* | 2/2012 | Basu ............ G06Q 20/02 705/67 |
| 2012/0047237 A1 | 2/2012 | Arvidsson |
| 2012/0066078 A1 | 3/2012 | Kingston |
| 2012/0072350 A1 | 3/2012 | Goldthwaite |
| 2012/0078735 A1 | 3/2012 | Bauer |
| 2012/0078798 A1 | 3/2012 | Downing |
| 2012/0078799 A1 | 3/2012 | Jackson |
| 2012/0095852 A1 | 4/2012 | Bauer |
| 2012/0095865 A1 | 4/2012 | Doherty |
| 2012/0116902 A1 | 5/2012 | Cardina |
| 2012/0123882 A1 | 5/2012 | Carlson |
| 2012/0123940 A1 | 5/2012 | Killian |
| 2012/0129514 A1 | 5/2012 | Beenau |
| 2012/0143767 A1 | 6/2012 | Abadir |
| 2012/0143772 A1 | 6/2012 | Abadir |
| 2012/0158580 A1 | 6/2012 | Eram |
| 2012/0158593 A1 | 6/2012 | Garfinkle |
| 2012/0173431 A1 | 7/2012 | Ritchie |
| 2012/0185386 A1 | 7/2012 | Salama |
| 2012/0197807 A1 | 8/2012 | Schlesser |
| 2012/0203664 A1 | 8/2012 | Torossian |
| 2012/0203666 A1 | 8/2012 | Torossian |
| 2012/0215688 A1 | 8/2012 | Musser |
| 2012/0215696 A1 | 8/2012 | Salonen |

(56) References Cited

U.S. PATENT DOCUMENTS

| | | |
|---|---|---|
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain |
| 2012/0265631 A1 | 10/2012 | Cronic |
| 2012/0271770 A1 | 10/2012 | Harris |
| 2012/0297446 A1 | 11/2012 | Webb |
| 2012/0300932 A1 | 11/2012 | Cambridge |
| 2012/0303503 A1 | 11/2012 | Cambridge |
| 2012/0303961 A1 | 11/2012 | Kean |
| 2012/0304273 A1 | 11/2012 | Bailey |
| 2012/0310725 A1 | 12/2012 | Chien |
| 2012/0310831 A1 | 12/2012 | Harris |
| 2012/0316992 A1 | 12/2012 | Oborne |
| 2012/0317035 A1 | 12/2012 | Royyuru |
| 2012/0317036 A1 | 12/2012 | Bower |
| 2013/0017784 A1 | 1/2013 | Fisher |
| 2013/0019098 A1 | 1/2013 | Gupta |
| 2013/0054337 A1 | 2/2013 | Brendell |
| 2013/0054466 A1 | 2/2013 | Muscato |
| 2013/0054474 A1 | 2/2013 | Yeager |
| 2013/0080327 A1 | 3/2013 | Baldrick et al. |
| 2013/0081122 A1 | 3/2013 | Svigals |
| 2013/0091028 A1 | 4/2013 | Oder ("J.D."), II |
| 2013/0110658 A1 | 5/2013 | Lyman |
| 2013/0111599 A1 | 5/2013 | Gargiulo |
| 2013/0117185 A1 | 5/2013 | Collison |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith |
| 2013/0145148 A1 | 6/2013 | Shablygin |
| 2013/0145172 A1 | 6/2013 | Shablygin |
| 2013/0159178 A1 | 6/2013 | Colon |
| 2013/0166402 A1 | 6/2013 | Parento |
| 2013/0166456 A1 | 6/2013 | Zhang |
| 2013/0173736 A1 | 7/2013 | Krzeminski |
| 2013/0185202 A1 | 7/2013 | Goldthwaite |
| 2013/0191286 A1 | 7/2013 | Cronic |
| 2013/0191289 A1 | 7/2013 | Cronic |
| 2013/0198071 A1 | 8/2013 | Jurss |
| 2013/0200146 A1 | 8/2013 | Moghadam |
| 2013/0204787 A1 | 8/2013 | Dubois |
| 2013/0204793 A1 | 8/2013 | Kerridge |
| 2013/0212007 A1 | 8/2013 | Mattsson |
| 2013/0212017 A1 | 8/2013 | Bangia |
| 2013/0212019 A1 | 8/2013 | Mattsson |
| 2013/0212024 A1 | 8/2013 | Mattsson |
| 2013/0212666 A1 | 8/2013 | Mattsson |
| 2013/0218698 A1 | 8/2013 | Moon |
| 2013/0226813 A1 | 8/2013 | Voltz |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246267 A1 | 9/2013 | Tobin |
| 2013/0254028 A1 | 9/2013 | Salci |
| 2013/0254052 A1 | 9/2013 | Royyuru |
| 2013/0254102 A1 | 9/2013 | Royyuru |
| 2013/0254117 A1 | 9/2013 | Von Mueller |
| 2013/0262296 A1 | 10/2013 | Thomas |
| 2013/0262302 A1 | 10/2013 | Lettow |
| 2013/0262315 A1 | 10/2013 | Hruska |
| 2013/0262316 A1 | 10/2013 | Hruska |
| 2013/0262317 A1 | 10/2013 | Collinge |
| 2013/0275300 A1 | 10/2013 | Killian |
| 2013/0275307 A1 | 10/2013 | Khan |
| 2013/0275308 A1 | 10/2013 | Paraskeva |
| 2013/0282502 A1 | 10/2013 | Jooste |
| 2013/0282575 A1 | 10/2013 | Mullen |
| 2013/0282588 A1 | 10/2013 | Hruska |
| 2013/0297504 A1 | 11/2013 | Nwokolo |
| 2013/0297508 A1 | 11/2013 | Belamant |
| 2013/0304649 A1 | 11/2013 | Cronic |
| 2013/0308778 A1 | 11/2013 | Fosmark |
| 2013/0311382 A1 | 11/2013 | Fosmark |
| 2013/0317982 A1 | 11/2013 | Mengerink |
| 2013/0332344 A1 | 12/2013 | Weber |
| 2013/0339253 A1 | 12/2013 | Sincai |
| 2013/0346314 A1 | 12/2013 | Mogollon |
| 2014/0007213 A1 | 1/2014 | Sanin |
| 2014/0013106 A1 | 1/2014 | Redpath |
| 2014/0013114 A1 | 1/2014 | Redpath |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson |
| 2014/0040139 A1 | 2/2014 | Brudnicki |
| 2014/0040144 A1 | 2/2014 | Plomske |
| 2014/0040145 A1 | 2/2014 | Ozvat |
| 2014/0040148 A1 | 2/2014 | Ozvat |
| 2014/0040628 A1 | 2/2014 | Fort |
| 2014/0041018 A1 | 2/2014 | Bomar |
| 2014/0046853 A1 | 2/2014 | Spies |
| 2014/0052532 A1 | 2/2014 | Tsai |
| 2014/0052620 A1 | 2/2014 | Rogers |
| 2014/0052637 A1 | 2/2014 | Jooste |
| 2014/0164243 A1* | 6/2014 | Aabye ............... G06Q 20/3821 705/44 |
| 2015/0032625 A1 | 1/2015 | Dill |
| 2015/0032626 A1 | 1/2015 | Dill |
| 2015/0032627 A1 | 1/2015 | Dill |
| 2015/0046338 A1* | 2/2015 | Laxminarayanan ........................ G06Q 20/38215 705/67 |

FOREIGN PATENT DOCUMENTS

| | | |
|---|---|---|
| WO | 2001035304 A9 | 5/2001 |
| WO | 2004042536 A2 | 5/2004 |
| WO | 2006113834 A2 | 10/2006 |
| WO | 2009032523 A1 | 3/2009 |
| WO | 2010078522 A1 | 7/2010 |
| WO | 2012068078 A2 | 5/2012 |
| WO | 2012098556 A1 | 7/2012 |
| WO | 2012142370 A2 | 10/2012 |
| WO | 2012167941 A1 | 12/2012 |
| WO | 2013048538 A1 | 4/2013 |
| WO | 2013056104 A1 | 4/2013 |
| WO | 2013119914 A1 | 8/2013 |
| WO | 2013179271 A2 | 12/2013 |

OTHER PUBLICATIONS

Petition for Inter Partes Review of U.S. Pat. No. 8,533,860 Challenging Claims 1-30 Under 35 U.S.C. § 312 and 37 C.F.R. § 42.104, filed Feb. 17, 2016, Before the USPTO Patent Trial and Appeal Board, IPR 2016-00600, 65 pages.

* cited by examiner

US 10,977,657 B2

TOKEN PROCESSING UTILIZING MULTIPLE AUTHORIZATIONS

CROSS-REFERENCES TO RELATED APPLICATIONS

This application is a non-provisional application of and claims the benefit of the filing date of U.S. Provisional Application No. 62/113,671, filed on Feb. 9, 2015, which is herein incorporated by reference in its entirety.

BACKGROUND

In recent years, payment tokens have been used in place of primary account numbers (PANs). While payment tokens can functions like PANs, they are not PANs. For example, instead of having ubiquitous properties, tokens are intentionally restricted. These restrictions are known as domain restrictions. The purpose of domain restrictions is to protect both the consumer and merchant from fraudulent and inappropriate purchases. Tokens are issued with domain restrictions based on the nature of the token requestor. In many cases, the token requestor will not be a merchant, but will be a mobile communication device with an issuer or third party wallet application. This means that some tokens are only able to operate in select channels. For instance, a token may be limited to an environment where the card data is stored such as a secure element or in a database. A token stored with these kind of domain restrictions cannot be used in another channel. Cryptography is the method used to protect card data and tokens and acts as proof of the interaction between the consumer and a merchant.

Because tokens are format preserving, meaning that they look and act like a PAN, a merchant that accepts the token may not be aware that domain restrictions may be applied to their transactions. This creates an inconsistency between PANs and tokens.

Embodiments of the invention address this and other problems, individually and collectively.

BRIEF SUMMARY

Embodiments enable processing of transactions utilizing multiple authorizations. Such transactions may utilize tokens, which may cause problems since the tokens can have different domain restrictions and authorizations can occur in different environments. For example, an initial authorization using a token can be for a card not present transaction (e.g., a transaction in which a payment device such as a credit card is not physically present when conducting a transaction at a point of sale) and a subsequent authorization using that token for a related transaction can be for a card present transaction (e.g., a transaction in which a payment device is physically present at a point of sale). A token restricted to a card not present environment may not be able to be properly processed if the subsequent authorization is outside of its domain. This inconsistency may result in transactions being unnecessarily declined.

One embodiment of the invention is directed to a method comprising: a) receiving, by a server computer, an authorization request message comprising a token from a resource provider computer for a transaction conducted in a second domain, wherein the authorization request message includes a related transaction indicator for a prior transaction and reference data for the prior transaction, and wherein the prior transaction was conducted in a first domain that is different from the second domain; b) determining, by the server computer, that the token is being used outside of the first domain; c) determining, by the server computer, that the authorization request message includes the related transaction indicator and the reference data; d) in response to steps b) and c), determining, by the server computer, the account identifier associated with the token; and e) initiating authorizing the transaction using the account identifier.

Another embodiment of the invention is directed to a server computer comprising: a processor; and a computer readable medium, the computer readable medium comprising code, executable by the processor, to implement a method comprising a) receiving, by a server computer, an authorization request message comprising a token from a resource provider computer for a transaction conducted in a second domain, and wherein the authorization request message includes a related transaction indicator for a prior transaction and reference data for the prior transaction, wherein the prior transaction was conducted in a first domain that is different from the second domain; b) determining, by the server computer, that the token is being used outside of the first domain; c) determining, by the server computer, that the authorization request message includes the related transaction indicator and the reference data; d) in response to steps b) and c), determining, by the server computer, the account identifier associated with the token; and e) initiating authorizing the transaction using the account identifier.

These and other embodiments of the invention are described in further detail below.

DETAILED DESCRIPTION

Figure 1:
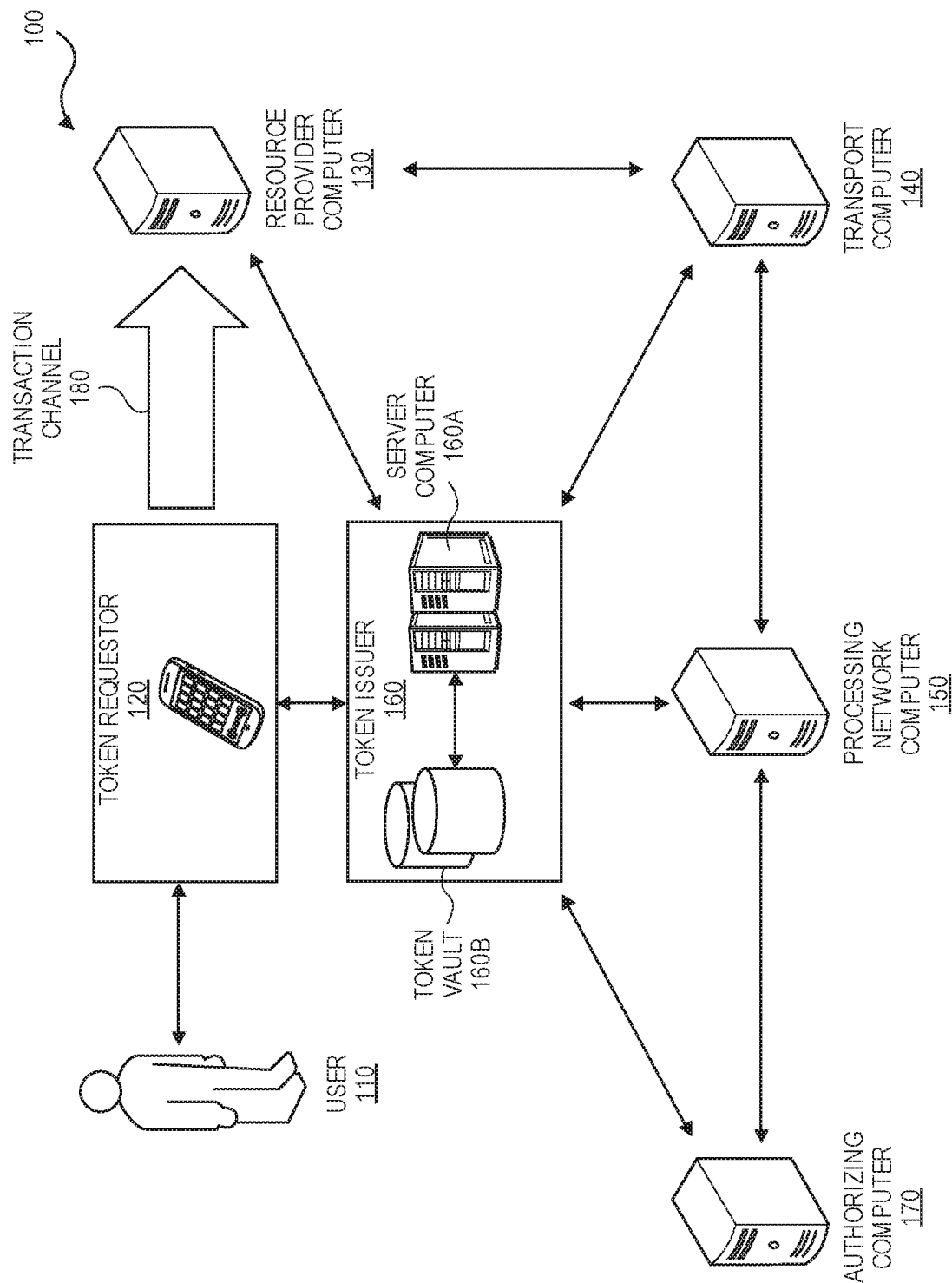
FIG. 1 shows a block diagram of a system illustrating a token transaction processing system according to embodiments of the present invention.

Before discussing specific embodiments and examples, some descriptions of some terms that are used are provided below.

A "communication device" may comprise any suitable electronic device that may be operated by a user, which may also provide remote communication capabilities to a network. A "mobile communication device" may be an example of a "communication device" that can be easily transported. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of mobile communication devices include mobile phones (e.g. cellular phones), PDAs, tablet computers, net books, laptop computers, personal music players, hand-held specialized readers, etc. Further examples of mobile communication devices include wearable devices, such as smart watches, fitness bands, ankle bracelets, rings, earrings, etc., as well as automobiles with remote communication capabilities. In some embodiments, a mobile communication device can function as a payment device (e.g., a mobile communication device can store and be able to transmit payment credentials for a transaction).

A "payment device" may include any suitable device that may be used to conduct a financial transaction, such as to provide payment credentials to a merchant. The payment device may be a software object, a hardware object, or a physical object. As examples of physical objects, the payment device may comprise a substrate such as a paper or plastic card, and information that is printed, embossed, encoded, or otherwise included at or near a surface of an object. A payment device may be associated with a value such as a monetary value, a discount, or store credit, and a payment device may be associated with an entity such as a bank, a merchant, a payment processing network, or a person. Suitable payment devices can be hand-held and compact so that they can fit into a user's wallet and/or pocket (e.g., pocket-sized). Example payment devices may include smart cards, magnetic stripe cards, keychain devices (such as the Speedpass™ commercially available from Exxon-Mobil Corp.), etc. Other examples of payment devices include payment cards, smart media, transponders, and the like. If the payment device is in the form of a debit, credit, or smartcard, the payment device may also optionally have features such as magnetic stripes. Such devices can operate in either a contact or contactless mode.

A "credential" may be any suitable information that serves as reliable evidence of worth, ownership, identity, or authority. A credential may be a string of numbers, letters, or any other suitable characters, as well as any object or document that can serve as confirmation. Examples of credentials include value credentials, identification cards, certified documents, access cards, passcodes and other login information, etc.

"Payment credentials" may include any suitable information associated with an account (e.g. a payment account and/or payment device associated with the account). Such information may be directly related to the account or may be derived from information related to the account. Examples of account information may include a PAN (primary account number or "account number"), user name, expiration date, and verification values such as CVV, dCVV, CVV2, dCVV2, and CVC3 values.

A "digital wallet" can include an electronic device that allows an individual to conduct electronic commerce transactions. A digital wallet may store user profile information, payment credentials, bank account information, one or more digital wallet identifiers and/or the like and can be used in a variety of transactions, such as but not limited to eCommerce, social networks, money transfer/personal payments, mobile commerce, proximity payments, gaming, and/or the like for retail purchases, digital goods purchases, utility payments, purchasing games or gaming credits from gaming websites, transferring funds between users, and/or the like. A digital wallet may be designed to streamline the purchase and payment process. A digital wallet may allow the user to load one or more payment cards onto the digital wallet so as to make a payment without having to enter an account number or present a physical card.

A "token" may be a substitute value for a credential. A token may be a string of numbers, letters, or any other suitable characters. Examples of tokens include payment tokens, access tokens, personal identification tokens, etc.

A "payment token" may include an identifier for a payment account that is a substitute for an account identifier, such as a primary account number (PAN). For example, a payment token may include a series of alphanumeric characters that may be used as a substitute for an original account identifier. For example, a token "4900 0000 0000 0001" may be used in place of a PAN "4147 0900 0000 1234." In some embodiments, a payment token may be "format preserving" and may have a numeric format that conforms to the account identifiers used in existing transaction processing networks (e.g., ISO 8583 financial transaction message format). In some embodiments, a payment token may be used in place of a PAN to initiate, authorize, settle or resolve a payment transaction or represent the original credential in other systems where the original credential would typically be provided. In some embodiments, a payment token may be generated such that the recovery of the original PAN or other account identifier from the token value may not be computationally derived. Further, in some embodiments, the token format may be configured to allow the entity receiving the token to identify it as a token and recognize the entity that issued the token.

"Tokenization" is a process by which data is replaced with substitute data. For example, a payment account identifier (e.g., a primary account number (PAN)) may be tokenized by replacing the primary account identifier with a substitute number (e.g. a token) that may be associated with the payment account identifier. Further, tokenization may be applied to any other information that may be replaced with a substitute value (i.e., token). Tokenization enhances transaction efficiency and security.

A "token issuer," token provider" or "token service system" can include a system that services tokens. In some embodiments, a token service system can facilitate requesting, determining (e.g., generating) and/or issuing tokens, as well as maintaining an established mapping of tokens to primary account numbers (PANs) in a repository (e.g. token vault). In some embodiments, the token service system may establish a token assurance level for a given token to indicate the confidence level of the token to PAN binding. The token service system may include or be in communication with a token vault where the generated tokens are stored. The token service system may support token processing of payment transactions submitted using tokens by de-tokenizing the tokens to obtain the actual PANs. In some embodiments, a token service system may include a tokenization computer alone, or in combination with other computers such as a transaction processing network computer. Various entities of a tokenization ecosystem may assume the roles of the token service provider. For example, payment networks and issuers or their agents may become the token service provider by implementing the token services according to embodiments of the present invention.

A "token domain" may indicate an area and/or circumstance in which a token can be used. Examples of token domains may include, but are not limited to, payment channels (e.g., e-commerce, physical point of sale, etc.), POS entry modes (e.g., contactless, magnetic stripe, etc.), and merchant identifiers to uniquely identify where the token can be used. A set of parameters (i.e. token domain restriction controls) may be established as part of token issuance by the token service provider that may allow for enforcing appropriate usage of the token in payment transactions. For example, the token domain restriction controls may restrict the use of the token with particular presentment modes, such as contactless or e-commerce presentment modes. In some embodiments, the token domain restriction controls may restrict the use of the token at a particular merchant that can be uniquely identified. Some exemplary token domain restriction controls may require the verification of the presence of a token cryptogram that is unique to a given transaction. In some embodiments, a token domain can be associated with a token requestor.

A "token expiry date" may refer to the expiration date/time of the token. The token expiry date may be passed among the entities of the tokenization ecosystem during transaction processing to ensure interoperability. The token expiration date may be a numeric value (e.g. a 4-digit numeric value). In some embodiments, the token expiry date can be expressed as an time duration as measured from the time of issuance.

A "token request message" may be an electronic message for requesting a token. A token request message may include information usable for identifying a payment account or digital wallet, and/or information for generating a payment token. For example, a token request message may include payment credentials, mobile device identification information (e.g. a phone number or MSISDN), a digital wallet identifier, information identifying a tokenization service provider, a merchant identifier, a cryptogram, and/or any other suitable information. Information included in a token request message can be encrypted (e.g., with an issuer-specific key).

A "token response message" may be a message that responds to a token request. A token response message may include an indication that a token request was approved or denied. A token response message may also include a payment token, mobile device identification information (e.g. a phone number or MSISDN), a digital wallet identifier, information identifying a tokenization service provider, a merchant identifier, a cryptogram, and/or any other suitable information. Information included in a token response message can be encrypted (e.g., with an issuer-specific key).

A "token requestor identifier" may include any characters, numerals, or other identifiers associated with an entity associated with a network token system. For example, a token requestor identifier may be associated with an entity that is registered with the network token system. In some embodiments, a unique token requestor identifier may be assigned for each domain for a token request associated with the same token requestor. For example, a token requestor identifier can identify a pairing of a token requestor (e.g., a mobile device, a mobile wallet provider, etc.) with a token domain (e.g., e-commerce, contactless, etc.). A token requestor identifier may include any format or type of information. For example, in one embodiment, the token requestor identifier may include a numerical value such as a ten digit or an eleven digit number (e.g., 4678012345).

A "user" may include an individual. In some embodiments, a user may be associated with one or more personal accounts and/or mobile devices. The user may also be referred to as a cardholder, account holder, or consumer in some embodiments.

A "resource provider" may be an entity that can provide a resource such as goods, services, information, and/or access. Examples of resource providers includes merchants, data providers, transit agencies, governmental entities, venue and dwelling operators, etc.

A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "authorizing entity" may be an entity that authorizes a request. Examples of an authorizing entity may be an issuer, a governmental agency, a document repository, an access administrator, etc.

An "issuer" may typically refer to a business entity (e.g., a bank) that maintains an account for a user. An issuer may also issue payment credentials stored on a user device, such as a cellular telephone, smart card, tablet, or laptop to the consumer.

An "access device" may be any suitable device that provides access to a remote system. An access device may also be used for communicating with a merchant computer, a transaction processing computer, an authentication computer, or any other suitable system. An access device may generally be located in any suitable location, such as at the location of a merchant. An access device may be in any suitable form. Some examples of access devices include POS or point of sale devices (e.g., POS terminals), cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a mobile communication or payment device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. In some embodiments, a cellular phone, tablet, or other dedicated wireless device used as a POS terminal may be referred to as a mobile point of sale or an "mPOS" terminal.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. POS equipment) that indicates approval of the transaction. The code may serve as proof of authorization.

"Reference data" for a prior transaction that may be present in an authorization request for a subsequent transaction may include any suitable indicator of the prior transaction. For example, in some embodiments of the invention, "reference data" may include a retrieval reference number, a transaction identifier, a merchant or resource provider identifier, a location of the resource provider, a date and/or timestamp, etc. The reference data may also include data related to a decline for a prior transaction. Also, the reference data may be of any suitable length or may include any suitable combination of characters.

A "related transaction indicator" may include any suitable data that indicates that the current transaction is related to a past transaction. In some embodiments, the related transaction indicator may include, for example, a resubmission indicator, an incremental authorization indicator, a recurring payment indicator, etc. Additional examples are provided in the examples below. Also, the related transaction indicator may be of any suitable length or may include any suitable combination of characters.

A "token presentment mode" may indicate a method through which a token is submitted for a transaction. Some non-limiting examples of the token presentment mode may include machine readable codes (e.g., QR™ code, bar code, etc.), mobile contactless modes (e.g., near-field communication (NFC) communication), e-commerce remote modes, e-commerce proximity modes, and any other suitable modes in which to submit a token.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

I. Exemplary Systems

FIG. 1 shows a block diagram illustrating a transaction processing system 100 according to an embodiment of the invention. The transaction processing system 100 may comprise a user 110 (e.g., an account holder) interacting with a token requestor 120. In this embodiment, the token requester 120 may be any suitable device suitable for carrying out a transaction associated with a resource provider computer 130. The token requestor 120 may also be capable of communicating with the resource provider computer 130 or the token issuer 160. The token issuer 160 may include a token issuer server computer 160A and a token vault 160B coupled to the token issuer computer 160A. In some embodiments, the token issuer 160 may also be a token verifier. In other embodiments, the token issuer 160 and the token verifier may be separate entities where the token issuer 160 may generate tokens while a token verifier may be configured to validate or verify tokens issued by the token issuer 160.

The transaction processing system 100 may further comprise a transport computer 140, a processing network computer 150, and an authorizing computer 170. The token requestor 120 may be configured to communicate with the resource provider computer 130 through a transaction channel 180. The transaction channel 180 may be, for example, a proximity or contactless transaction channel, an e-commerce transaction channel, a contact based transaction channel (e.g., magnetic stripe, etc.), etc.

The token issuer 160 can be configured to communicate with the resource provider computer 130, the transport computer 140, the processing network computer 150, the authorizing computer 170, and the token requestor 120 over any suitable communications network (e.g., the Internet or a telecommunications network).

The user 110 may use a portable consumer device (e.g., a credit card). The account holder 110 may also use a communication device (e.g., a mobile phone) that can serve as the token requestor 120 during a transaction with a resource provider such as a merchant. In some embodiments, the communication device may function as a payment device.

The token requestor 120 may be a device or entity that may be associated with a payment account of the account holder 110. In some implementations, the token requestor 120 may be a mobile communication device such as a mobile phone, a tablet, a PDA, a notebook computer, a key fob, or any suitable device. The token requestor 120 may include a digital or mobile wallet and/or a payment application that may be associated with one or more payment accounts of the account holder 110. In some embodiments, the mobile communication device may be configured to display a machine readable code, such as a QR code or barcode. The mobile communication device may also include a camera or a scanning device capable of scanning machine readable code. In some embodiments, a user may use a token requestor device to interface with a token requestor that may be provided through a remote computer (e.g., mobile wallet provider), etc. Accordingly, the user may use their mobile device to obtain a token that is stored by a remote server computer of a mobile wallet provider that may have previously obtained a token from a token issuer. Accordingly, there may be multiple token requestor devices in some embodiments and/or a communication device of a user (e.g., mobile device, laptop computer, desktop computer, etc.) that may be used to provide a previously requested token to a resource provider computer or access device.

As noted above, the token requestor 120 may communicate with the resource provider computer 130 via the transaction channel 180. The transaction channel 180 may be established using any suitable communication protocol. In some embodiments, the token requestor 120 may be capable of communicating with the resource provider computer 130 using a contactless or proximity communication method such as NFC (near field communications) or machine readable codes such as QR codes. In some embodiments, if the resource provider computer 130 is an access device, such as a POS terminal, the user 110 may interact with the resource provider computer 130 by tapping or waving the payment device near an access device associated with the resource provider computer 130.

The resource provider computer 130 may be associated with a merchant. The resource provider computer 130 may be an access device such as a POS terminal at a merchant location, a computer coupled with an access device of a merchant, or a remote server computer that operates a web site operated by the merchant. In some embodiments, the merchant operating the resource provider computer 130 may be a card-on-file (COF) merchant. The card-on-file merchant may store consumer account information in a remote database for future payments (e.g., recurring or periodic payments). The resource provider computer 130 may be configured to generate an authorization request message for a transaction that is initiated by the user 110. In some embodiments, the resource provider computer 130 may generate multiple authorization request messages if the transaction involves multiple authorizations.

The transport computer 140 may be operated by an acquirer. An acquirer is typically a system for an entity (e.g., a bank) that has a business relationship with a particular merchant, a wallet provider or another entity. The transport computer 140 may be communicatively coupled to the resource provider computer 130 and the processing network computer 150 and may issue and manage an account of the merchant. In some embodiments, the transport computer 140 may forward the authorization request message to the processing network computer 150 and the authorization response message to the resource provider computer 130 during a transaction to confirm processing of a payment transaction.

The processing network computer 150 may be configured to provide authorization services, and clearing and settlement services for payment transactions. A processing network computer 150 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular includes a Visa Integrated Payments (VIP) system which processes authorization requests and a Base II system which performs clearing and settlement services. Furthermore, the payment processing network may include a server computer and may use any suitable wired or wireless telecommunications network, including the Internet. In some embodiments, the processing network computer 150 may forward an authorization request received from the transport computer 140 to the authorizing computer 170 via a communication channel. The processing network computer 150 may further forward an authorization response message received from the authorizing computer 170 to the transport computer 140.

The authorizing computer 170 may be operated by an account issuer. Typically the issuer is an entity (e.g., a bank) that issues and maintains an account of the user 110. The account may be a credit, debit, prepaid, or any other type of account.

The authorizing computer 160 may be a stand-alone entity or may be coupled to, integrated into, and/or operated or managed by any of the entities shown in FIG. 1. The authorizing computer 160 may issue tokens and may also verify the status of tokens. In such cases, the authorizing computer 160 may alternatively be referred to as a token verifier or token issuer. Additionally, in some embodiments, the token issuer and the token verifier may include separate entities and/or systems that may be configured to issue or generate tokens and validate or verify tokens.

According to some embodiments of the present invention, the token issuer 160 may be configured to perform a method including receiving a token request from a requestor, generating a token, and providing the token to the requestor. Additionally, in some embodiments, the token issuer 160 may verify tokens for a requestor.

The token issuer 160 may interface with the token requestor 120 (e.g., mobile communication device) using a token requestor API interface. The token requestor API interface may provide a standard interface for the token requestor 120 to request and receive an issued token, request and receive information regarding whether a token is activated or deactivated, authenticate a received token, and/or manage the token through its lifecycle. Accordingly, a token requestor 120 may request that a token be issued by the token issuer 160, send a previously issued token (or message identifying the token) to the token issuer 160 to activate or deactivate the token, send a request to the token issuer 160 to authenticate the token, or provide a number of management functions regarding the lifecycle of the token. In some embodiments, the token issuer 160 may communicate with an issuer or payment processing network to perform some or all of these functions.

The token issuer 160 may communicate with the resource provider computer 130 through the use of APIs. The token issuer 160 may exchange tokens and process or route tokens to an appropriate entity for the resource provider operating the resource provider computer 130. Additionally, the token issuer 160 may communicate with the transport computer 140 through APIs. The APIs may standardize messaging between the resource provider or transport computers 130, 140 such that they may exchange and route tokens.

The token issuer 160 may interface with the authorizing computer 170 using authorizing computer APIs. The token issuer 160 registers and authenticates tokens for the issuer.

The token issuer computer 160 may interface with the processing network computer 150 through the use of a network or a gateway API. In some embodiments, the processing network computer 150 or a gateway API may provide message and token translation between network processing systems.

Messages between the computers, networks, and devices in FIG. 1 may be transmitted using a secure communications protocols such as, but not limited to, File Transfer Protocol (FTP); HyperText Transfer Protocol (HTTP); Secure HyperText Transfer Protocol (HTTPS), Secure Socket Layer (SSL), ISO (e.g., ISO 8583) and/or the like.

II. Methods

Some embodiments of the invention are directed to methods. The methods may include performing first and second transactions, where the second transaction is linked to the first transaction. Although two transactions are described in detail, it is understood that embodiments of the invention may encompass more than two transactions that may be associated with a single interaction event between a resource provider and a user.

In the first transaction, a server computer receives a first authorization request message comprising a token and a cryptogram from a resource provider computer. Prior to this, the resource provider computer receives the token and the cryptogram from a communication device used by a user. The communication device may be a mobile phone, which may function as a payment device. The cryptogram may have been generated using an encryption key that resides on the communication device. The encryption key may be used to encrypt data from the resource provider computer (e.g., a terminal ID, date and time of the transaction, etc.) and data from the communication device (e.g., a device ID, the token, the token expiration date, etc.) to form the cryptogram.

After the server computer receives the first authorization request message, the server computer determines that the token is being conducted within the first domain. It can do this by verifying the cryptogram and/or analyzing a transaction channel indicator in the authorization request message. The first domain may be a domain that requires that a contactless payment device interact with the resource provider computer at a point of sale. If the token is not being used in the correct domain, then the transaction may be rejected at this point and an authorization response message may be sent back to the resource provider computer indicating the same.

After the server computer determines that the token is being used in the proper domain, the server computer then determines the account identifier associated with the token. The server computer can determine the account identifier in any number of ways. In some embodiments, the server computer may transmit the token to an token issuer, and the token issuer may return the real account identifier. In other embodiments, the real account identifier may be mathematically derived from the token, and the server computer can derive the real account identifier from the token.

Once the real account identifier is determined, the server computer modifies the first authorization request message to include the account identifier. The server computer then forwards the first authorization request message to an authorizing computer. After forwarding the first authorization request message to the authorizing computer, the authorizing computer determines if the transaction should be declined or approved. An authorizing computer may decline a transaction for a number of reasons. For instance, an authorizing computer may decline a transaction, because there are insufficient funds and/or credit in the account, or the amount of the transaction is over a daily limit.

In some embodiments of the invention, the authorizing computer could decline the transaction. The server computer then receives a first authorization response message from the authorizing computer declining the first transaction, and the first authorization response message is forwarded to the resource provider computer.

In a second subsequent transaction that is linked to the first transaction, the server computer receives a second authorization request message comprising the token from the resource provider computer for a transaction conducted in a second domain. In this example, in the second transaction, the resource provider did not receive the token and the cryptogram from the token requestor as in the first transaction. The second authorization request message includes one or more of an amount, the token, a related transaction indicator for the first transaction, reference data for the first transaction, and other information. The first domain is different from the second domain. For example, the second domain may be a transaction that is a "device not present" transaction where a physical device is not used at the point of transaction. That is, the resource provider may initiate the second authorization request without the user being present at the time that the second authorization request is initiated.

After the server computer receives the second authorization request message, the server computer parses the second authorization request message to identify the token. The server computer then determines that the token is being used outside of the first domain. The server computer also determines that the authorization request message includes the related transaction indicator and the reference data. It may also determine that there is no cryptogram that is present in the data field that would normally contain the cryptogram. Although the second subsequent transaction is being conducted via a different domain than the first transaction, the server computer will still continue to process the transaction and will not decline the transaction. This is because the server computer has determined that the current transaction is related to the first transaction and is not an original submission. The server computer then determines the account identifier associated with the token and initiates authorizing the transaction using the account identifier.

In embodiments of the invention, initiating authorizing the transaction may include performing authorization processing on the second transaction or it may include forwarding the second authorization request message to an authorizing computer to allow the authorizing computer to perform authorization processing. In either case, a second authorization response message may be sent back to the resource provider computer from the server computer (e.g., a processing network computer or an authorizing computer), optionally via a transport computer.

If the second transaction is approved, then a clearing and settlement process can occur between the various parties to the second transaction (or the first transaction, if appropriate).

There are various situations in which exemplary transactions may utilize multiple authorization processing as described above. Although many of the examples described below relate to financial transactions, embodiments of the invention are not limited to financial transactions. For example, embodiments of the invention can be used in situations where access to a resource (e.g., such as access to a service) is desired.

Some embodiments of the invention may be used in Offline Data Authentication (ODA). ODA is used in environments where sub-second transaction speed is necessary to facilitate a high volume of consumers or connectivity to an authorization source is unavailable. Transit and airline in-flight purchases are classic examples of this business practice. In this environment, a token submitted from a proximity device is domain restricted to prevent card not present (CNP) transactions, thereby preventing a merchant from collecting funds associated with the consumers purchase when the original authorization is declined.

In typical operation in this environment, a consumer interacts with a merchant's contactless reader, where only basic information is verified prior to providing the consumer with service. In the case of transit, the fare gate opens and the consumer is able to enter. The contactless cryptogram information can be captured and transmitted at a later time. The merchant submits an authorization along with the relevant cryptogram information. This occurs after the consumer has already received the goods or service. In this case, the authorization is submitted after the fare gate has opened and the consumer has already begun their transit journey. Subsequently, the cryptogram is validated and the issuer either approves or declines the transaction. While the merchant is taking the risk for the transaction, the merchant and consumer have entered into a purchase agreement. The merchant has the right to collect the debt in situations where the transaction was declined for insufficient funds (NSF), as this is a temporary account disposition. The merchant sends a card not present (CNP) transaction without a cryptogram for any re-authorization attempt caused by the insufficient (NSF) state.

While it is impractical to have merchants store the cryptogram information after a successful authorization message has been provided with an issuer decision, removing domain restrictions would be counter to the objectives of tokens. Therefore, a resubmission may be proposed to address this transit use case. A resubmission may be a transaction that refers to an original consumer initiated card present transaction, but is initiated by the merchant without cryptogram information.

Some characteristics of a resubmission may be described. The original transaction conducted by the consumer may be a card present, contactless transaction associated with valid Merchant Category Codes (e.g., from transport, travel, entertainment, etc.) that is declined due to the consumer having insufficient funds or being over the daily withdrawal limit. In some embodiments, the resubmission does not have cryptographic information. Accordingly, the same point of sale entry mode as the original decline may be used for the resubmission. Reference to one or more key data elements from the authorization decline, such as a transaction identifier, a reference number, or timestamp may be utilized in the resubmission. Further, a related transaction indicator such as a unique data element indicating the transaction is a resubmission may be included.

In some embodiments, the merchant may utilize a resubmission under certain conditions. The merchant may initiate a resubmission, once per day for a time period (e.g., fourteen days), after which the resubmission may be invalid. In some embodiments, the merchant may not submit a resubmission for a transaction that does not reference an original transaction as indicated by the presence of the reference data.

A processing network computer (or token issuer) may validate data elements in the resubmission against those in the original decline transaction. The clearing message associated with the transaction may comprise the related transaction indicator such as a unique resubmission indicator. Further, an issuer may modify its authorization systems and risk management tools to recognize the resubmission in the authorization message. For example, the issuer may provide a specific response code depending on certain reasons for the decline (e.g., insufficient fund, account closed, over daily withdrawal limits, etc.). If the transaction is declined due to a closed account or a cryptogram fail, the issuer may provide different response codes. In some embodiments, the issuer may prioritize a decline caused by cryptographic reasons over a decline cause by insufficient funds or exceeding daily withdrawal limit. The tracing data from the decline may be utilized in subsequent debt collection requests to establish that the transaction was properly authenticated.

Figure 2:
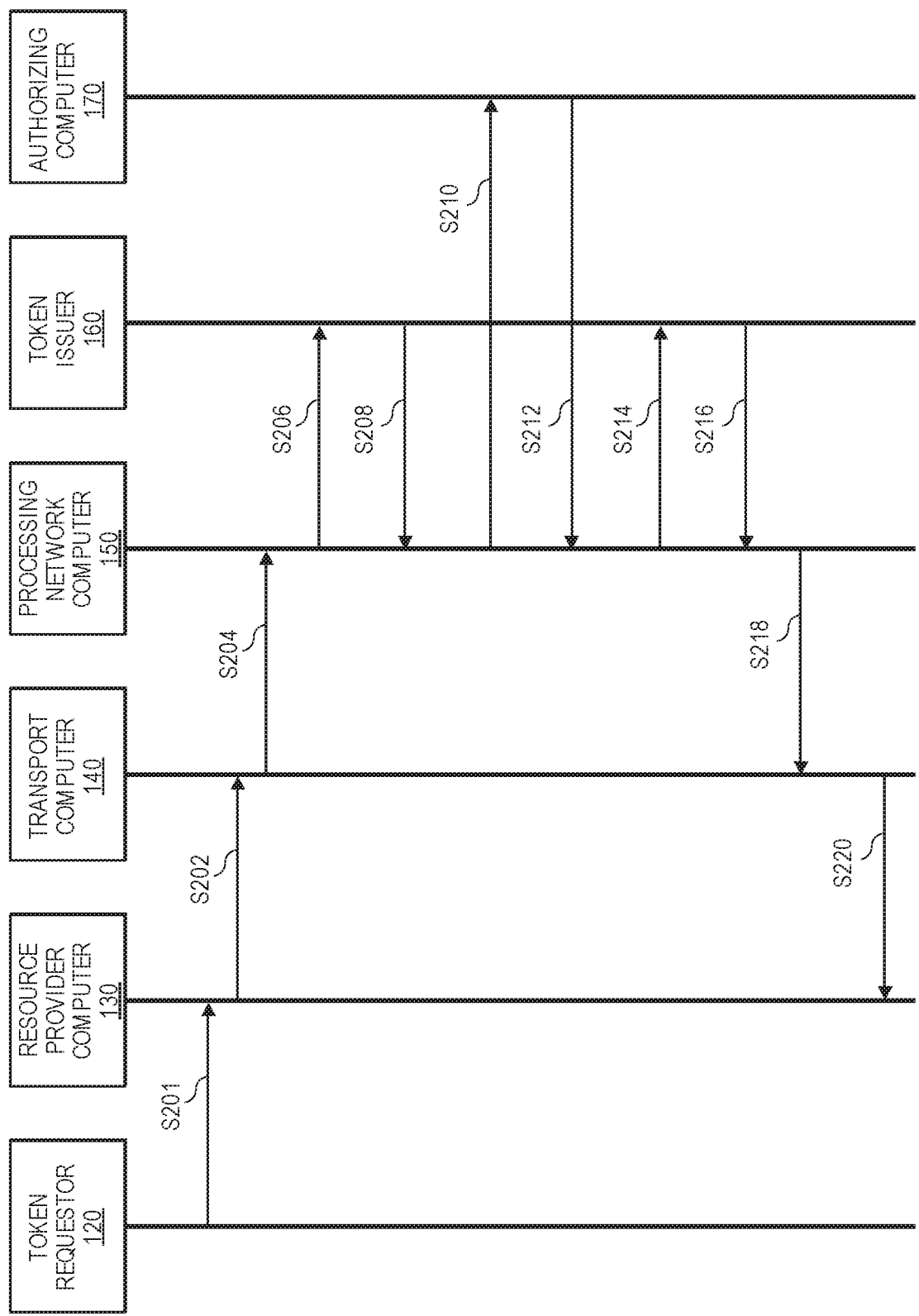
FIG. 2 shows a flow diagram illustrating a first transaction process flow according to an embodiment of the invention.
Figure 3:
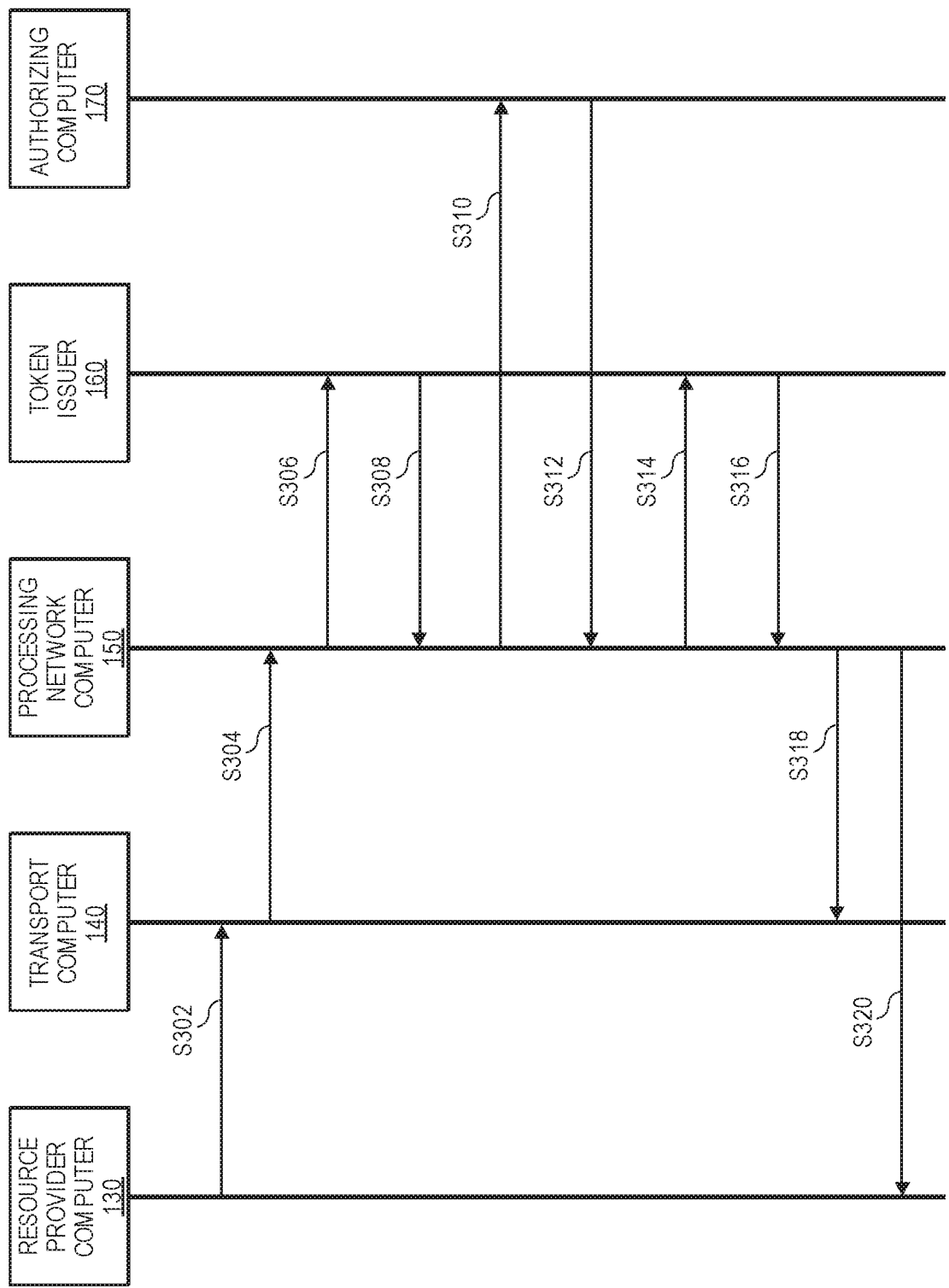
FIG. 3 shows a flow diagram illustrating a second transaction process flow according to an embodiment of the invention.
Figure 4:
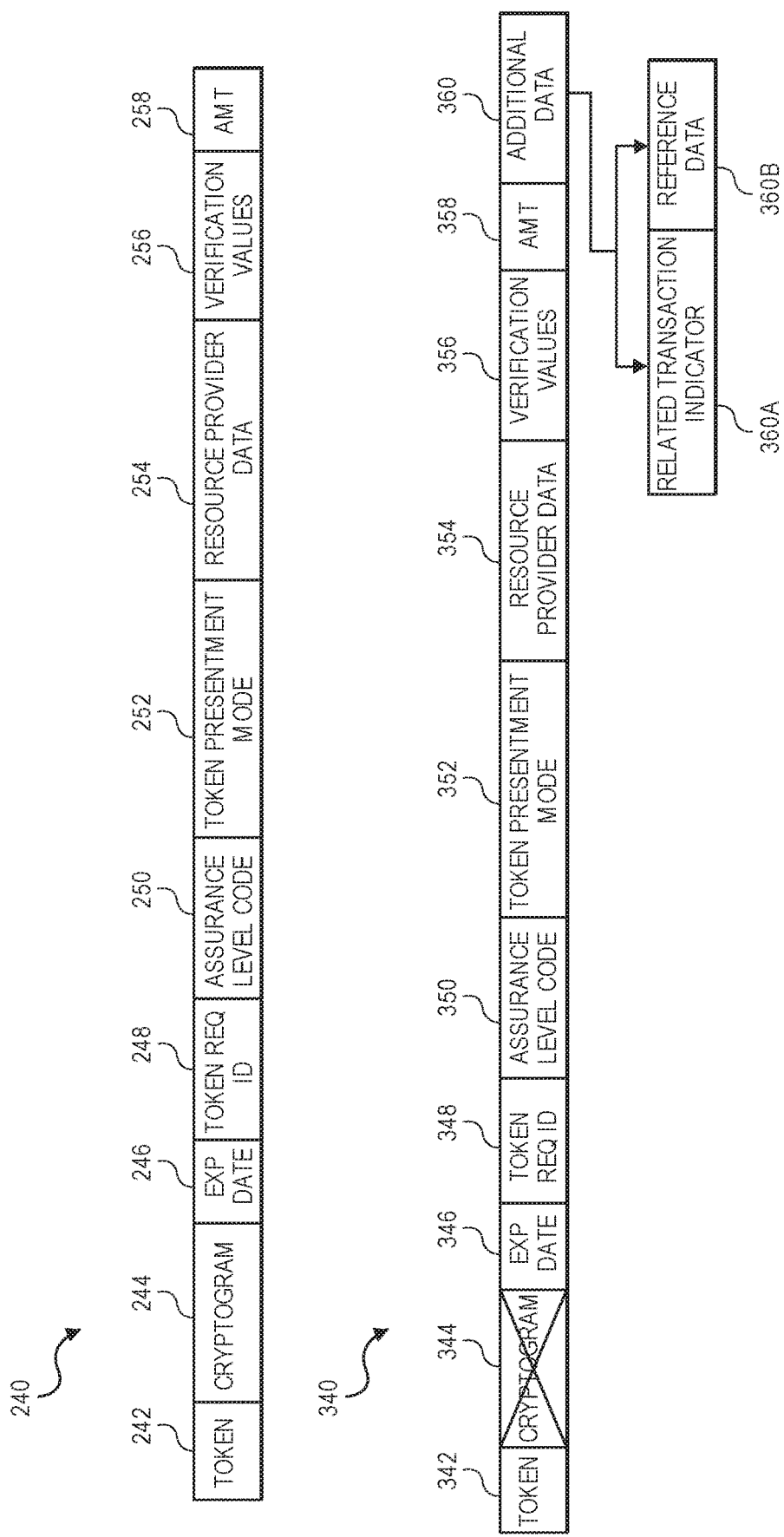
FIG. 4 shows data elements that can be present in first and second authorization request messages.

FIGS. 2-4 can be used to illustrate the above-described example. FIG. 2 is a flow diagram illustrating a method for perform a first transaction. FIG. 3 is a flow diagram illustrating a method for performing a second transaction. The second transaction may be a resubmission transaction. FIG. 4 shows data elements that can be in authorization request messages that are transported in the first transaction and the second transaction.

Referring to FIG. 2, at step 201, a token requestor 120 can interact with a resource provider computer 130 to conduct a transaction. In one example, the resource provider computer 130 may be a transit gate associated with a transit agency. During the interaction between the resource provider computer 130 and the token requestor 120, data can be exchanged between the resource provider computer 130 and the token requestor 120. For example, the resource provider computer 130 may pass information including one or more of a computer or terminal ID, a transaction amount, a date and/or time, and any other transaction specific information. Once received, any of this information may be optionally combined with information from the token requestor 120 and then encrypted with an encryption key in the token requestor 120 to form a cryptogram. Information stored in the token requestor 120 may include information including the token, an expiration date of the token, and/or a token requestor ID. The token, the cryptogram, and any of the information (e.g., an expiry date for the token) from the token requestor 120 may then be transmitted to the resource provider computer 130.

At step S202, the resource provider computer 130 may generate a first authorization request message, and the first authorization request message may be transmitted to a transport computer 140. Some data elements in the authorization request message are shown as reference number 240 in FIG. 4. The first authorization request message may comprise, but is not limited to a token 242, a cryptogram 244, an expiration (or expiry) date 246, a token requestor ID 248, an assurance level code 250, a token presentment mode 252, resource provider data 254, verification values 246, and an amount 258.

At step S204, the transport computer 140 may receive, analyze, and then transmit the first authorization request message to the processing network computer 150.

At step S206, the processing network computer 150 may receive and may then determine that the first authorization request message contains the token. It may also send the token and any other pertinent information to the token issuer 160. Other pertinent information may include any channel indicators or transaction characteristics such as transaction amount. Such information can be used to the token issuer 160 to determine if the token that is being used is within the domain restrictions set for that token. For example, if the token is only to be used in card present type transactions where a device is physically present at the point of interaction with the resource provider, then cryptogram may serve as an indicator that the token requestor 120 was physically present at the point of interaction with the resource provider. The processing network computer 150 may decrypt or otherwise determine the data elements that were used to form the cryptogram and can verify that the token requestor 120 was in fact physically present at the point of interaction with the resource provider. If the token issuer 160 determines that the token is valid, the token issuer 160 may then retrieve the account identifier such as the real account number corresponding to the token from a database. Alternatively, the token issuer 160 may derive (mathematically) the account identifier from the token.

In step S208, after the token issuer 160 retrieves the real account identifier, the token issuer 160 sends the real account identifier to the processing network computer 150. After receiving the real account identifier, in step S210, the processing network computer 150 may modify the previously received authorization request message to include the real account identifier and may forward it to the authorizing computer 170. At this point the authorizing computer 170, and the authorization computer 170 may determine if there are or are not sufficient funds and/or credit in the account associated with the real account identifier. It may also determine whether or not the transaction is indicative of fraud.

Although the token issuer 160 and the processing network computer 150 are shown as being two separate entities, in other embodiments, the token issuer 160 and the processing network computer 150 may be a single entity and may be embodied by a single server computer or computer system in some embodiments of the invention.

In this particular example, the account associated with the real account identifier may have insufficient funds to conduct the transaction. However, because transit transactions need to proceed before the authorization process can be completed, the user that operates the token requestor 120 may simply be allowed to pass into the transit system even though the transaction was officially declined.

In step S212, once the authorizing computer has made an authorization decision, the authorizing computer 170 may then send a first authorization response message back to the processing network computer 150.

In step S214, after receiving the first authorization request message from the authorizing computer 170, the processing network computer 150 may then send the real account identifier back to the token issuer 160.

In step S216, after the token issuer 160 receives the real account identifier, the token issuer 160 may send back the token corresponding to the real account identifier. After the processing network computer 150 receives the token from the token issuer 160, the processing network computer 150 may modify the first authorization response message received from the authorizing computer 170 to replace the real account identifier with the token.

In step S218, the first authorization response message comprising the token is forwarded to the transport computer 140. After the transport computer 140 receives the first authorization response message, it then sends the first authorization response message to the resource provider computer 130.

As noted above, in this example, the user may have insufficient funds, even though the user was allowed to pass into the transit system. Because the user was able to obtain the benefit of the transit service without paying for it, the transit agency (a merchant in this case) may be allowed to resubmit the authorization request in a second transaction. However, the resubmission would occur without the user's token requestor device 120 because the user is not present. The transaction that would need to be conducted would therefore by a "card not present" or "device not present" type of transaction. While the transit agency may store the token in a local database, the transit agency would not store the cryptogram. As such, in prior systems, if the transit agency resubmits another authorization request, it would be denied because the token, which was domain restricted to card present transactions, is now being used in a card or device not present type of transaction.

Embodiments of the invention address this problem by removing the cryptogram from the second authorization request message. Alternatively, a related transaction indicator and reference data linking the second transaction to the first transaction may be present in the second authorization request message. In both instances, the processing network computer 150 can determine that the use of the token is valid in the second transaction, even though it is being used in a domain that is not the intended domain of the token.

FIG. 3 is a flow diagram illustrating a method for perform a second transaction.

At step S302, a resource provider computer 130 may generate a second authorization request message, and the second authorization request message may be transmitted to a transport computer 140. In this exemplary second transaction, the token requestor 120 did not pass the token and the cryptogram used in the first transaction to the resource provider computer 130. Rather, the resource provider computer 130 obtained the token from a data store at the resource provider computer 130. Some data elements in the authorization request message are shown as reference number 340 in FIG. 4. The second authorization request message may comprise the token 342, an empty data field for a cryptogram 344, the expiration date 346, the token requestor ID 348, the assurance level code 350, the token presentment mode 352, resource provider data 354, verification values 356, an amount 58, and additional data 360. The additional data 360 may include a related transaction indicator 360A and/or reference data 360B associated with the first authorization request including a transaction ID, a time and date of the first authorization request, etc.

At step S304, the transport computer 140 may receive and then transmit the second authorization request message to the processing network computer 150.

At step S306, the processing network computer 150 may receive, and may then determine that the second authorization request message contains the token. The processing network computer 150 may then determine the real account identifier from the token. This can be done in any suitable manner. For example, the processing network computer 150 may then send the token and any other pertinent information to the token issuer 160. Other pertinent information may include any channel indicators or transaction characteristics such as the transaction amount. Such information can be used by the token issuer 160 to determine if the token that is being used is within the domain restrictions set for that token. In this case, the processing network computer 150 may determine that the cryptogram data field 344 is empty and that the additional data 360 indicates that this second authorization request is tied to the first authorization request. The absence of the cryptogram in the cryptogram data field 344 indicates to the processing network computer 150 that the transaction may be processed, even though the token is being used in a domain that is different than its intended domain restriction. If the token issuer 160 determines that the token is valid, the token issuer 160 may then retrieve the real account number corresponding to the token from a database. Alternatively, the real account number may be mathematically derived from the token.

In step S308, after the token issuer 160 obtains the real account number, the token issuer 160 sends the real account identifier to the processing network computer 150. After receiving the real account identifier, in step S310, the processing network computer 150 may modify the previously received second authorization request message to include the real account identifier and may forward it to the authorizing computer 170. At this point, the authorizing computer 170 may determine if there are or are not sufficient funds and/or credit in the account associated with the real account identifier. It may also determine whether or not the transaction is indicative of fraud.

In step S312, once the authorizing computer has made an authorization decision, the authorizing computer 170 may then send a second authorization response message back to the processing network computer 150.

In step S314, after receiving the second authorization request message from the authorizing computer, the processing network computer 150 may then send the real account identifier back to the token issuer 160.

In step S316, after the token issuer 160 receives the real account identifier, the token issuer 160 may send back the token corresponding to the real account identifier. After the processing network computer 150 receives the token from the token issuer 160, the processing network computer 150 may modify the authorization response message received from the authorizing computer 170 to replace the real account identifier with the token.

In step S218, the second authorization response message comprising the token is forwarded to the transport computer 140. After the transport computer 140 receives the authorization response message, it then sends the second authorization response message to the resource provider computer 100.

At the end of the day or at any other suitable period of time, a clearing and settlement processing between the processing network computer 150, the transport computer 140, and the authorizing computer 170 may take place.

The above transit transaction example is but one instance in which embodiments of the invention may be used. A number of additional use cases for embodiments of the invention are illustrated below.

Hotel and car rental agencies have a variety of use cases that present challenges when tokens are involved. For example, some use cases include transactions involving incremental authorizations, no show charges, and ancillary charges. In each case, the merchant may properly disclose to the consumer that the consumer will be responsible for any charges associated with either the reservation or stay in accordance with the terms and conditions provided. However, domain restrictions on tokens can cause legitimate transactions from being processed.

Incremental authorizations may occur when a merchant initiates one or more authorizations after the initial consumer interaction (e.g., hotel check-in, car rental) to add incremental funds to the original authorization. Incremental authorizations may refer back to the reference data including key data elements of the original transaction, such as a retrieval reference number or transaction identifier, and may be restricted to certain relevant merchant categories (e.g., travel, entertainment, etc.). The incremental authorization message may comprise a related transaction indicator such as a unique identifier to signal the application of unique authorization or risk rules.

Incremental authorization may be conducted under certain conditions. For example, the incremental authorization may have a related transaction indicator such as a unique identifier to indicate that the authorization will not contain cryptography, but will contain a transaction identifier. The authorization request may comprise characteristics of the original transaction. In some embodiments, a single clearing transaction may be conducted for the original authorization as well as all subsequent authorizations. The single clearing transaction may reflect the sum of all incremental authorizations, the entry mode of the first transaction (e.g., POS), and the transaction identifier of the original transaction.

In some cases, transactions may involve no show charges. For example, when a consumer completes a reservation with a hotel, the hotel may generate an authorization request to validate the consumer account. However, the account may not be charged until the consumer checks in. Any cryptography associated with the initial authorization may not be stored by the merchant. If the consumer does not cancel the reservation prior to the "Terms and Conditions" provided by the merchant, it may be valid for the merchant to submit a transaction to charge the consumer. The merchant may or may not generate an authorization. The no show transaction may be identified in the submitted transaction so that the merchant can be protected from chargeback.

A no-show transaction may be problematic when utilized with tokenization. If a token is presented for the initial reservation as a chip based ecommerce transaction, the domain restrictions associated with chip based ecommerce may prevent a pure CNP transaction from being presented.

To address this problem, merchants may be enabled to initiate a device not present (e.g., card not present) no show transaction without requiring storage of cryptography. For example, one or more of the authorization or clearing message may identify the transaction as one that involves a no show event, as well as reference the original authorization. Additionally, information surrounding the original transaction may be also provided (e.g., hotel check-in date, car rental date). The no show transaction may be particularly useful in relevant merchant category codes (e.g., hotel, car rental, etc.).

Some merchants may have consumers preauthorize a maximum billing amount prior to an actual authorization. This may occur when the final amount of the authorization is not known and will be delayed after the consumer has received services from the merchant. This may cause issues for transactions involving tokens since the original transaction billing the maximum amount and the actual transaction billing the actual amount may be conducted in a different domain.

To address this problem, the merchant may initiate an authorization for the maximum preauthorized billing amount at the time a service is delivered to the consumer. This request may contain the cryptography associated with the channel used by the consumer (e.g., card present or CNP). This can allow the issuer to validate the card. The actual authorization of the actual transaction may reference authorization data associated with the date the service was performed, as well as a related transaction indicator such as a unique preauthorization billing indicator. In some embodiments, the authorization may be limited to certain relevant merchant category codes (e.g., healthcare).

Other challenges with tokens can be present in cross channel transactions. As brick and mortal merchants compete in the retail world, they are looking for ways to integrate their retail outlets with their web/mobile presence. This may allow merchants to compete effectively with online merchants by enabling the consumer convenience of shopping online, with not having to wait for the goods to be delivered. However, integrating these different environments may cause issues for transactions as there are several situations in which a consumer may make a purchase across channels.

In one payment model, a consumer may buy goods at a merchant's store and ship the goods to another address (e.g., consumer's home address). However, certain issues may arise when utilizing this payment model. A consumer may not have access or full visibility to a token value in order to initiate a key entered transaction. If the consumer taps, swipes, or initiates an application based transaction with a token, the merchant may send the authorization to the issuer with the relevant cryptography to be validated. The merchant may not clear the transaction until the item has been shipped to the consumer, which can result in delays in the process that may affect the interchange qualification that is applied to the transaction.

To address this problem, if the merchant initiates an additional authorization after the initial transaction has been validated, the merchant may uniquely identify (e.g., via a related transaction indicator) the authorization as a re-authorization of a previous consumer event. Hence, the merchant may utilize not an incremental authorization, but rather a new authorization. The new authorization may not contain any cryptographic data and may refer to the original authorization by including reference data such as data surrounding the original authorization (e.g., transaction identifier, local date and time, etc.). The new authorization may comprise a related transaction indicator such as a unique message value identifying it as a re-authorization, so that the transaction may be appropriately evaluated by the issuer and its applicable fraud tools. The transaction may reflect the same POS entry mode as presented in the original transaction, so that reference may be made to an original domain restriction (if desired).

In some cases, a card not present transaction may result in multiple clearing transactions in the case of split shipments, which may allow a single authorization to be cleared with multiple clearing items across multiple settlement days. This may typically be accomplished through the use of a multiple clearing sequence number (MCSN) and a single transaction identifier that may be utilized for more than one clearing item. The MCSN may communicate to the issuer to expect a total of N separate clearing items associated with the same transaction identifier. The issuer may expect that all items will be shipped within seven day period for preferential interchange qualifications. Merchants may prefer to authorize split shipments in order to ensure that they meet the seven day timeline, since the difference in interchange can be measurable. This also enables the authorization and clearing amount to match, which can be simpler for bookkeeping purposes. However, accommodations may enable a merchant initiated authorization in the event a portion of the purchase results in additional authorization.

The merchant initiated authorization may provide information to identify the new authorization as a split shipment, as well as include information surrounding the original authorization. Accordingly, the authorization may comprise a unique value to identify it as a split shipment, as well as the local date of the original transaction. The consumer order number and no cryptography may be present in the transaction. The split shipment authorization may indicate a card not present entry mode and domain restrictions may be channel specific based on the entry mode.

In some cases, a merchant may know that an item(s) in a consumer's order is immediately available and is on back order. The merchant may notify the consumer, and if the consumer wishes to continue with the order, the merchant may periodically authorize the total of the back order items. This typically occurs at an interval chosen by the merchant, but may not be less than every three days. This authorization interval ensures that funds are still available in the consumer's account. However, accommodations may be considered to enable better management of authorization results.

A back order authorization may comprise information to identify the new authorization as a back order, as well as include information surrounding the original transaction. Accordingly, the authorization may comprise a related transaction value such as a value to identify it as a back order, as well as reference data such as the local date of the original transaction. The consumer order number and no cryptography may be present in the back order transaction. Cryptography may be validated on the original transaction. The back order authorization will indicate a card not present entry mode and domain restrictions may be channel specific based on the entry mode.

While preorders may be similar to back orders and split shipments, they may carry some unique properties. A preorder may have a deposit associated with it, which could be a full payment or a partial payment. This enables a full transaction cycle at the time of the order. In cases where the merchant retains the card or token on file in order to perform subsequent authorizations, the merchant may not have the ability to acquire additional authentication from the consumer.

To accommodate, the preorder authorization may provide information that identifies the new authorization as related to a preorder. Accordingly, the authorization may comprise a related transaction indicator such as a value to identify it as a preorder, as well as reference data such as the local date of the original transaction. The consumer order number and no cryptography may be present in the preorder transaction. Cryptography may be validated on the original transaction. The preorder authorization may indicate a card not present mode and domain restrictions may be channel specific based on the entry mode.

Recurring transactions may occur when the cardholder and merchant agree to purchase goods or services on an ongoing basis over a period of time. Recurring transactions may comprise multiple transactions processed at predetermined intervals, with no more than one year between transactions. Examples of recurring transactions include insurance premiums, subscriptions, Internet service provider fees, membership fees, tuition, or utility charges. Typically, a merchant may renew the agreement on an annual basis.

Tokens may create a unique challenge for recurring merchants as the initial transaction can occur through either a card present or a card not present channel. Once the initial transaction occurs, the merchant may initiate all subsequent purchases on a periodic basis (e.g., monthly) by card not present transactions. Subsequent transactions may not contain cryptography as all are merchant initiated and based on the initial consumer instruction. In cases where a token may be domain restricted to a select environment, device, or channel, subsequent purchases may be inappropriately declined.

To address this problem, subsequent authorization requests in the recurring series may be processed as recurring transactions by use of a related transaction indicator including a recurring indicator. The merchant may not store and submit issuer authentication results with subsequent authorization transactions.

Installment transactions may be similar to recurring transactions with the exception that for an initial installment transaction, terms associated with the installment may be intended to be carried out with the initial transaction. Even the initial purchase may be defined as an installment transaction and may contain both the full amount of the purchase and the amount of each installment. An initial installment purchase may be a card present or card not present purchase and may be authenticated by the consumer presenting identification (e.g., PIN, Signature) or by an authentication service (e.g., Verified by Visa). Subsequent installment purchases may not carry authentication information. Transactions may be unnecessarily declined if subsequent transactions are submitted in a different domain than the initial transaction.

To address this problem, subsequent authorization requests may be processed as installment transactions by use of a related transaction indicator such as an installment indicator. The merchant may not store and submit issuer authentication results with subsequent authorization transactions.

In yet other embodiments, card present merchant may not be permitted to store a transaction that contains PIN data, but may store a signature based transaction to submit at a later time when communication with the network is restored. It is not uncommon for a merchant to experience a telecommunication failure that may prevent the merchant from connecting to the network to process transactions. This may also occur in disaster zones or as part of routine or normal system maintenance. When communication is lost, select merchant segments (e.g., fuel and supermarket merchants) provide consumers with the ability to purchase goods and services up to a maximum dollar amount. Typically, these merchant authorized amounts can be between a maximum of $50-$75 dollars.

The merchant may be assuming risk for the purchase in the event the purchase cannot be completed. In some embodiments, the merchant may utilize a positive or negative file to determine the level of risk to allow. Since tokens and PANs are not the same values, positive and negative files of merchant may cease to be effective. When a token is involved in the transaction, it is possible that the transaction may not be successful. The domain restrictions associated with tokens may make it far more likely that the transaction may be declined for a reason other than insufficient funds.

To address this problem, if a merchant successfully transmits the transaction with relevant cryptographic data associated with the consumer initiated request and the purchase is declined for insufficient funds by the issuer, the merchant may seek to complete the transaction by initiating a resubmission request. A resubmission may be a transaction that refers to an original consumer initiated card present transaction that is initiated by the merchant without use of cryptographic data. The resubmission may have similar characteristics to that described above regarding offline data authentication and may be valid for certain merchant category codes (e.g., fuel, supermarket).

A computer system that may be used to implement any of the entities or components described above can have any suitable components or subsystems. The subsystems can be interconnected via a system bus. Additional subsystems such as a printer, keyboard, fixed disk (or other memory comprising computer readable media), monitor, which is coupled to display adapter, and others may be used. Peripherals and input/output (I/O) devices, which couple to I/O controller (which can be a processor or other suitable controller), can be connected to the computer system by any number of means known in the art, such as a serial port. For example, a serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer readable medium. In some embodiments, the monitor may be a touch sensitive display screen.

Embodiments of the invention provide for a number of advantages. For example, embodiments of the invention can permit subsequent transactions that are related to prior transactions to be conducted with the same token, even though the token may be domain restricted. This is more efficient, than for example, issuing a separate token and cryptogram for each and every transaction submission in every conceivable domain. As such, embodiments of the invention are simpler and more complex than other potential processing protocols.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents. For example, many of the methods described above have different combinations of steps. Steps may be omitted, added, and/or combined without departing from the scope of the invention.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed:

1. A method comprising:
a) receiving, by a server computer from a resource provider computer over a network, a first authorization request message comprising a token and a cryptogram for a first transaction conducted in a first presentment mode;
b) determining, by the server computer, that the token is being used in the first presentment mode in association with the first transaction, using one or more of: the cryptogram and/or a first transaction channel indicator in the first authorization request message;
c) determining, by the server computer, an account identifier associated with the token;
d) modifying, by the server computer, the first authorization request message by adding the account identifier;
e) forwarding, by the server computer, the first authorization request message to an authorizing computer;
f) receiving, by the server computer, a first authorization response message from the authorizing computer declining the first transaction;
g) transmitting, by the server computer, the first authorization response message to the resource provider computer,
h) receiving, by the server computer from the resource provider computer over the network, a second authorization request message for a second transaction conducted in a second presentment mode, wherein the second presentment mode is different from the first presentment mode, the second authorization request message comprises the token, a related transaction indicator for the first transaction, and reference data for the first transaction, and the second authorization request message includes no cryptogram;

i) determining, by the server computer, that the token is not being used in the first presentment mode in association with the second transaction;

j) determining, by the server computer, that the second authorization request message includes the related transaction indicator and the reference data;

k) in response to steps i) and j), determining, by the server computer, the account identifier associated with the token; and l) initiating authorizing the second transaction using the account identifier, where initiating authorizing comprises one of: performing authorization processing on the second transaction or forwarding the second authorization request message to the authorizing computer.

2. The method of claim 1 wherein 1) initiating authorizing the second transaction using the account identifier comprises:

modifying, by the server computer, the second authorization request message to include the account identifier instead of the token;

transmitting, by the server computer, the second authorization request message to the authorizing computer;

receiving, by the server computer, a second authorization response message from the authorizing computer; and transmitting, by the server computer, the second authorization response message to the resource provider computer.

3. The method of claim 1, wherein the reference data comprises a transaction identifier associated with the first transaction.

4. The method of claim 1, wherein determining the account identifier comprises:

transmitting the token to a token issuer; and
receiving the account identifier from the token issuer.

5. The method of claim 1, wherein the server computer is a processing network computer.

6. A server computer comprising:
a processor; and
a non-transitory computer readable medium, the non-transitory computer readable medium comprising code that, when executed by the processor, causes the processor to perform a method comprising:

a) receiving, from a resource provider computer over a network, a first authorization request message comprising a token and a cryptogram for a first transaction conducted in a first presentment mode;

b) determining that the token is being used in the first presentment mode in association with the first transaction, using one or more of the cryptogram and/or a first transaction channel indicator in the first authorization request message;

c) determining an account identifier associated with the token;

d) modifying the first authorization request message by adding the account identifier;

e) forwarding the first authorization request message to an authorizing computer;

f) receiving a first authorization response message from the authorizing computer declining the first transaction;

g) transmitting the first authorization response message to the resource provider computer, h) receiving from the resource provider computer over the network, a second authorization request message for a second transaction conducted in a second presentment mode, wherein the second presentment mode is different from the first presentment mode, the second authorization request message comprises the token, a related transaction indicator for the first transaction, and reference data for the first transaction, and the second authorization request message includes no cryptogram;

i) determining the token is not being used in the first presentment mode in association with the second transaction;

j) determining that the second authorization request message includes the related transaction indicator and the reference data;

k) in response to steps i) and j), determining the account identifier associated with the token; and l) initiating authorizing the second transaction using the account identifier, where initiating authorizing comprises one of: performing authorization processing on the second transaction or forwarding the second authorization request message to the authorizing computer.

7. The server computer of claim 6, wherein 1) initiating authorizing the second transaction using the account identifier comprises:

modifying the second authorization request message to include the account identifier instead of the token;

transmitting the second authorization request message to the authorizing computer;

receiving a second authorization response message from the authorizing computer; and transmitting the second authorization response message to the resource provider computer.

8. The server computer of claim 6, wherein the reference data comprises a transaction identifier associated with the first transaction.

9. The server computer of claim 6, wherein determining the account identifier comprises:

transmitting the token to a token issuer; and
receiving the account identifier from the token issuer.

10. The server computer of claim 6, wherein the server computer is a processing network computer.

* * * * *